United States Patent
Sakhnini et al.

(10) Patent No.: US 11,690,072 B2
(45) Date of Patent: Jun. 27, 2023

(54) CONFIGURATION OF PIGGYBACK DOWNLINK CONTROL INFORMATION ON SEMI-PERSISTENT SCHEDULING RESOURCE

(71) Applicant: QUALCOMM Incorporated, San Diego, CA (US)

(72) Inventors: Iyab Issam Sakhnini, San Diego, CA (US); Qiang Wu, San Diego, CA (US); Tao Luo, San Diego, CA (US); Jun Ma, San Diego, CA (US); Mehmet Izzet Gurelli, San Diego, CA (US); Ahmed Abdelaziz Ibrahim Abdelaziz Zewail, San Diego, CA (US); Jing Sun, San Diego, CA (US); Xiaoxia Zhang, San Diego, CA (US); Juan Montojo, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 178 days.

(21) Appl. No.: 17/210,192

(22) Filed: Mar. 23, 2021

(65) Prior Publication Data
US 2021/0321439 A1 Oct. 14, 2021

Related U.S. Application Data

(60) Provisional application No. 63/007,169, filed on Apr. 8, 2020.

(51) Int. Cl.
*H04W 72/23* (2023.01)
*H04W 80/02* (2009.01)
*H04W 72/50* (2023.01)

(52) U.S. Cl.
CPC ......... *H04W 72/23* (2023.01); *H04W 72/535* (2023.01); *H04W 80/02* (2013.01)

(58) Field of Classification Search
CPC ......... H04W 72/1289; H04W 72/1257; H04W 80/02; H04L 5/001; H04L 5/0048; H04L 5/0082; H04L 5/0091; H04L 5/0023; H04L 5/0053
See application file for complete search history.

(56) References Cited

U.S. PATENT DOCUMENTS

| | | | |
|---|---|---|---|
| 2021/0250156 A1* | 8/2021 | Kim | H04W 72/0493 |
| 2021/0250920 A1* | 8/2021 | Kim | H04W 76/27 |
| 2022/0052829 A1* | 2/2022 | Kim | H04W 72/14 |

* cited by examiner

*Primary Examiner* — Afshawn M Towfighi
(74) *Attorney, Agent, or Firm* — Harrity & Harrity, LLP; Kevin T. Cheatham

(57) ABSTRACT

Various aspects of the present disclosure generally relate to wireless communication. In some aspects, a user equipment may receive configuration information that schedules a search space set; receive, on the search space set, first downlink control information (DCI) that schedules or configures one or more second DCIs that are multiplexed with one or more semi-persistent scheduling occasions; and process the one or more second DCIs based at least in part on the first DCI. Numerous other aspects are provided.

23 Claims, 11 Drawing Sheets

CONFIGURATION OF PIGGYBACK DOWNLINK CONTROL INFORMATION ON SEMI-PERSISTENT SCHEDULING RESOURCE

CROSS-REFERENCE TO RELATED APPLICATION

This Patent Applications claims priority to U.S. Provisional Patent Application No. 63/007,169, filed on Apr. 8, 2020, entitled "CONFIGURATION OF PIGGYBACK DOWNLINK CONTROL INFORMATION ON SEMI-PERSISTENT SCHEDULING RESOURCE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for configuration of piggyback downlink control information (DCI) on a semi-persistent scheduling (SPS) resource.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving configuration information that schedules a search space set; receiving, on the search space set, first downlink control information (DCI) that schedules or configures one or more second DCIs that are multiplexed with one or more semi-persistent scheduling occasions; and processing the one or more second DCIs based at least in part on the first DCI.

In some aspects, a method of wireless communication, performed by a user equipment, may include receiving MAC information that schedules or configures a set of DCIs that are multiplexed with one or more semi-persistent scheduling occasions; and processing the set of DCIs based at least in part on the MAC information.

In some aspects, a method of wireless communication, performed by a user equipment, may include receiving control information that is carried or multiplexed with a first downlink channel on a first semi-persistent scheduling (SPS) occasion; identifying, based at least in part on the control information, a set of DCIs that are multiplexed with a second downlink channel on a second SPS occasion; and processing the set of DCIs based at least in part on the control information.

In some aspects, a UE for wireless communication may include a memory and one or more processors operatively coupled to the memory. The memory and the one or more processors may be configured to receive configuration information that schedules a search space set; receive, on the search space set, first DCI that schedules or configures one or more second DCIs that are multiplexed with one or more semi-persistent scheduling occasions; and process the one or more second DCIs based at least in part on the first DCI.

In some aspects, a UE for wireless communication may include a memory and one or more processors operatively coupled to the memory. The memory and the one or more processors may be configured to receive MAC information that schedules or configures a set of DCIs that are multiplexed with one or more semi-persistent scheduling occasions; and process the set of DCIs based at least in part on the MAC information.

In some aspects, a UE for wireless communication may include a memory and one or more processors operatively coupled to the memory. The memory and the one or more processors may be configured to receive control information that is carried or multiplexed with a first downlink channel on a first semi-persistent scheduling (SPS) occasion; identify, based at least in part on the control information, a set of DCIs that are multiplexed with a second downlink channel on a second SPS occasion; and process the set of DCIs based at least in part on the control information.

In some aspects, a non-transitory computer-readable medium may store one or more instructions for wireless communication. The one or more instructions, when executed by one or more processors of a UE, may cause the one or more processors to receive configuration information that schedules a search space set; receive, on the search space set, first DCI that schedules or configures one or more second DCIs that are multiplexed with one or more semi-persistent scheduling occasions; and process the one or more second DCIs based at least in part on the first DCI.

In some aspects, a non-transitory computer-readable medium may store one or more instructions for wireless communication. The one or more instructions, when executed by one or more processors of a UE, may cause the one or more processors to receive MAC information that schedules or configures a set of DCIs that are multiplexed with one or more semi-persistent scheduling occasions; and process the set of DCIs based at least in part on the MAC information.

In some aspects, a non-transitory computer-readable medium may store one or more instructions for wireless communication. The one or more instructions, when executed by one or more processors of a UE, may cause the one or more processors to receive control information that is carried or multiplexed with a first downlink channel on a first semi-persistent scheduling (SPS) occasion; identify, based at least in part on the control information, a set of DCIs that are multiplexed with a second downlink channel on a second SPS occasion; and process the set of DCIs based at least in part on the control information.

In some aspects, an apparatus for wireless communication may include means for receiving configuration information that schedules a search space set; means for receiving, on the search space set, first DCI that schedules or configures one or more second DCIs that are multiplexed with one or more semi-persistent scheduling occasions; and means for processing the one or more second DCIs based at least in part on the first DCI.

In some aspects, an apparatus for wireless communication may include means for receiving MAC information that schedules or configures a set of DCIs that are multiplexed with one or more semi-persistent scheduling occasions; and means for processing the set of DCIs based at least in part on the MAC information.

In some aspects, an apparatus for wireless communication may include means for receiving control information that is carried or multiplexed with a first downlink channel on a first semi-persistent scheduling (SPS) occasion; means for identifying, based at least in part on the control information, a set of DCIs that are multiplexed with a second downlink channel on a second SPS occasion; and means for processing the set of DCIs based at least in part on the control information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
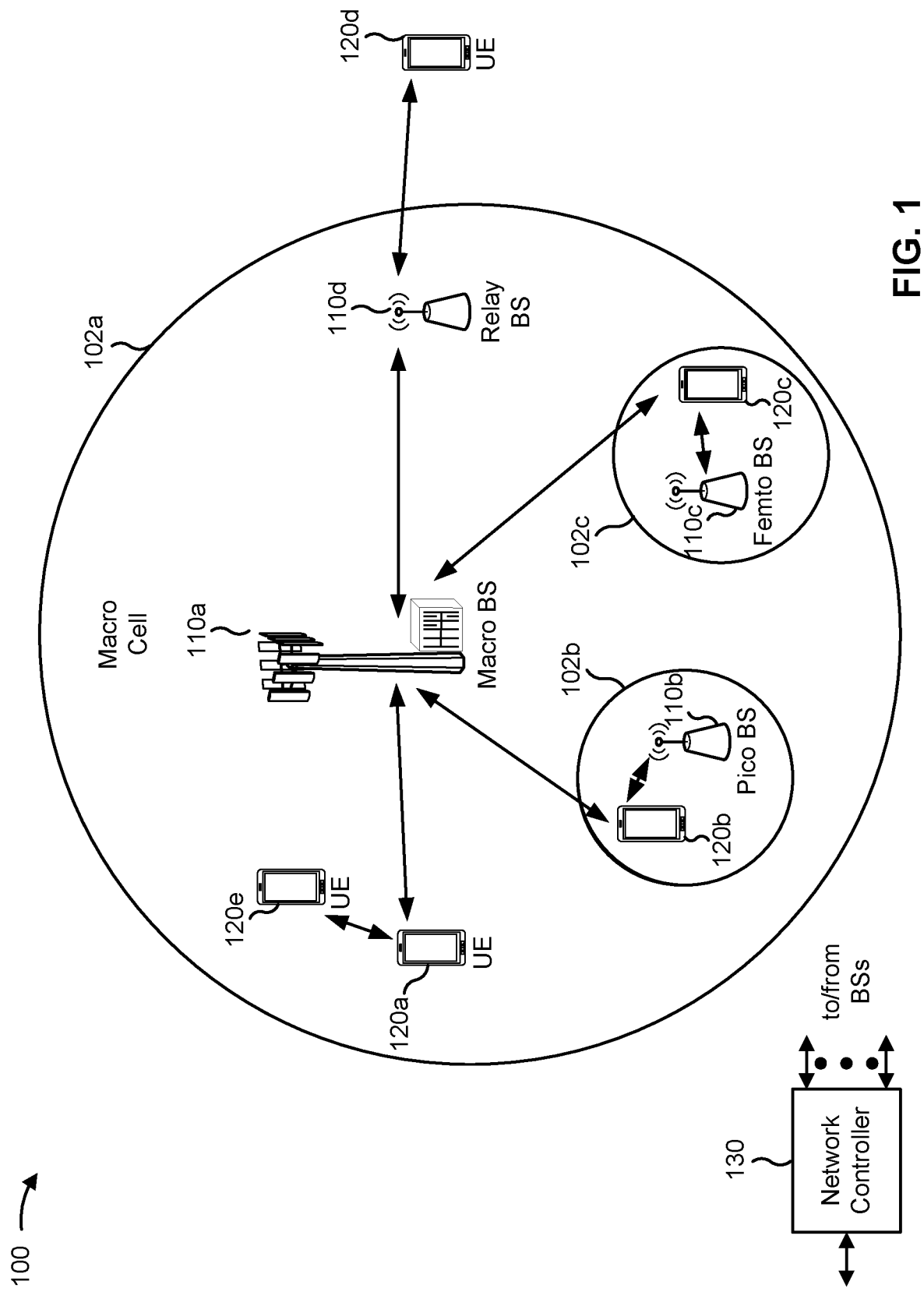
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
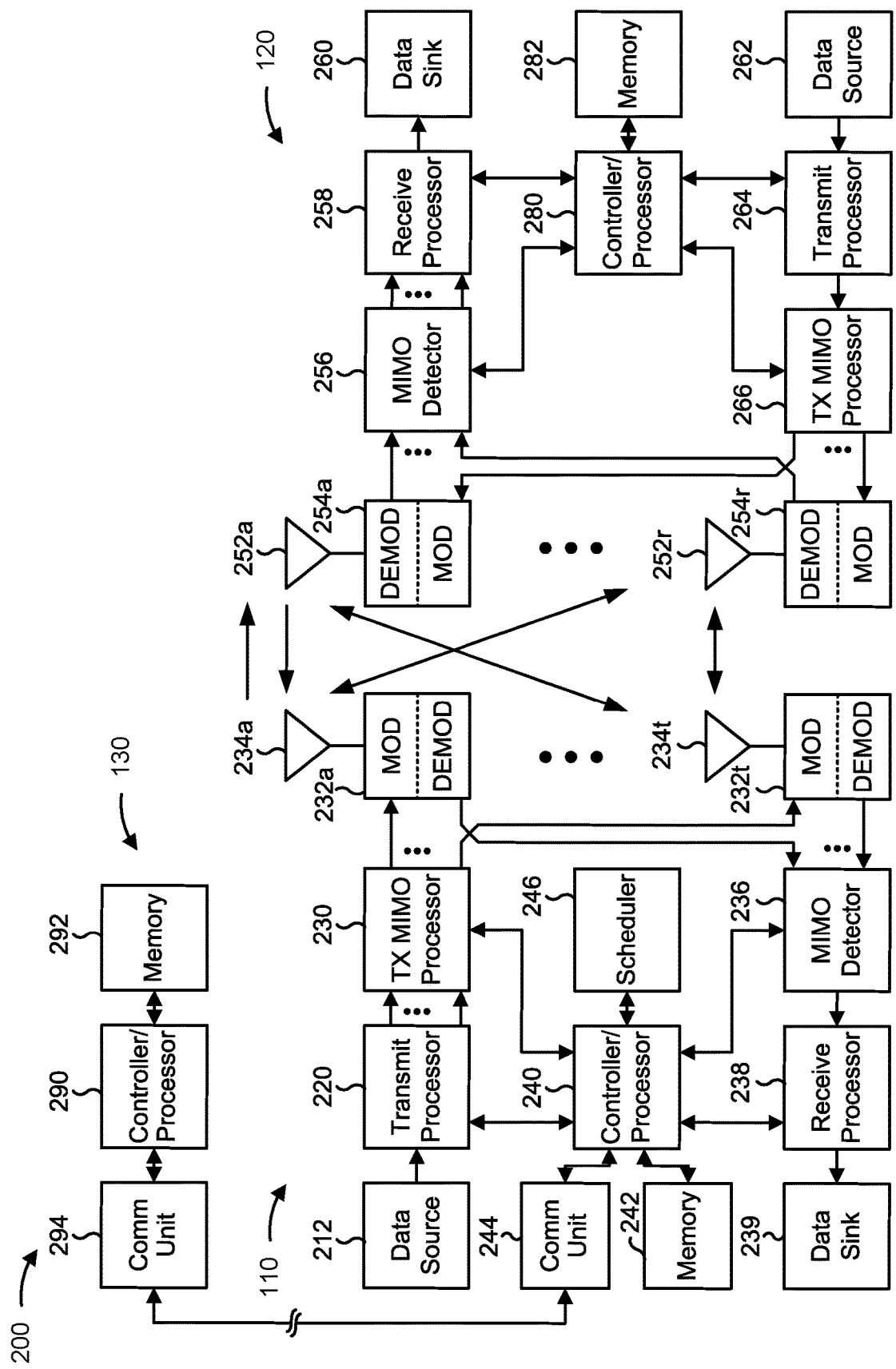
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-11).

Controller/processor 240 of base station 110, controller/processor 280 of UE 120, and/or any other component(s) of FIG. 2 may perform one or more techniques associated with, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, UE 120 may include means for receiving configuration information that schedules a search space set; means for receiving, on the search space set, first downlink control information (DCI) that schedules or configures one or more second DCIs that are multiplexed with one or more semi-persistent scheduling occasions; means for processing the one or more second DCIs based at least in part on the first DCI; means for receiving MAC information that schedules or configures a set of DCIs that are multiplexed with one or more semi-persistent scheduling occasions; means for processing the set of DCIs based at least in part on the MAC information; means for receiving control information that is carried or multiplexed with a first downlink channel on a first SPS occasion; means for identifying, based at least in part on the control information, a set of DCIs that are multiplexed with a second downlink channel on a second SPS occasion; means for processing the set of DCIs based at least in part on the control information; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some deployments, downlink control information (DCI) is provided on a physical downlink control channel (PDCCH). For example, the PDCCH may be provided separately from a physical downlink shared channel (PDSCH). A UE may monitor for a PDCCH on a PDCCH monitoring occasion. However, monitoring a PDCCH monitoring occasion may lead to power consumption at the UE and may involve some resource overhead.

In some cases, DCI may be provided within a PDSCH. DCI that is provided within a PDSCH may be referred to as "piggyback DCI" or "piggybacked DCI." Providing the DCI within the PDSCH may reduce the PDCCH monitoring requirements on the UE, thereby reducing power consumption and PDCCH monitoring overhead. This may be particularly beneficial in higher bands, such as the 60 GHz band. For example, the higher band may be associated with a larger number of PDCCH monitoring occasions in a given length of time due to the shorter slot duration, leading to proportionately higher PDCCH monitoring load for a given UE. As another example, in higher bands, a single UE is likely to receive DCI more frequently than in a lower band, particularly for bursty traffic. Piggybacked DCI may be particularly advantageous for reduced capability NR devices, such as reduced capability (RedCap) UEs, Internet of Things (IoT) UEs, machine-type communication UEs, and/or the like.

A PDSCH may carry multiple DCIs. In some cases, the PDSCH may be a repetitive PDSCH, such as a PDSCH on a semi-persistent scheduling (SPS) resource. In such a case, the SPS may be configured using radio resource control (RRC) signaling and may be activated using DCI. However, the number of DCIs carried in a PDSCH (referred to herein as the number of component DCIs of a piggyback DCI) may vary from PDSCH to PDSCH. The semi-static configuration of the SPS resource may not provide a mechanism for indicating how many DCIs are to be carried in a given PDSCH, since the number of DCIs may vary dynamically.

Some techniques and apparatuses described herein provide an indication relating to one or more piggyback DCIs, such as an indication of a resource allocation, an indication of a number of component DCIs included in the one or more piggyback DCIs, an indication of the presence of a piggyback DCI, and/or the like. For example, some techniques and apparatuses described herein may use a CORESET and search space set that occurs before one or more SPS occasions to indicate a configuration for the piggybacked DCI. Such a search space set may be associated with a reduced configuration, such as a single PDCCH candidate, a single aggregation level, and/or the like, thereby reducing PDCCH monitoring load relative to configuring the piggybacked DCI using a standard search space set. Some techniques and apparatuses described herein may use medium access control (MAC) signaling, such as a MAC control element (CE), to indicate a configuration for the piggybacked DCI, which reduces PDCCH monitoring load relative to configuring the piggybacked DCI using another DCI on a PDCCH. Some techniques and apparatuses described herein may use a first piggybacked DCI to indicate a configuration for a second piggybacked DCI, thereby reducing resource usage associated with using a DCI transmitted on a PDCCH to provide the configuration for the second piggybacked DCI. Thus, power consumption and overhead associated with piggybacked DCI are reduced.

Figure 3:
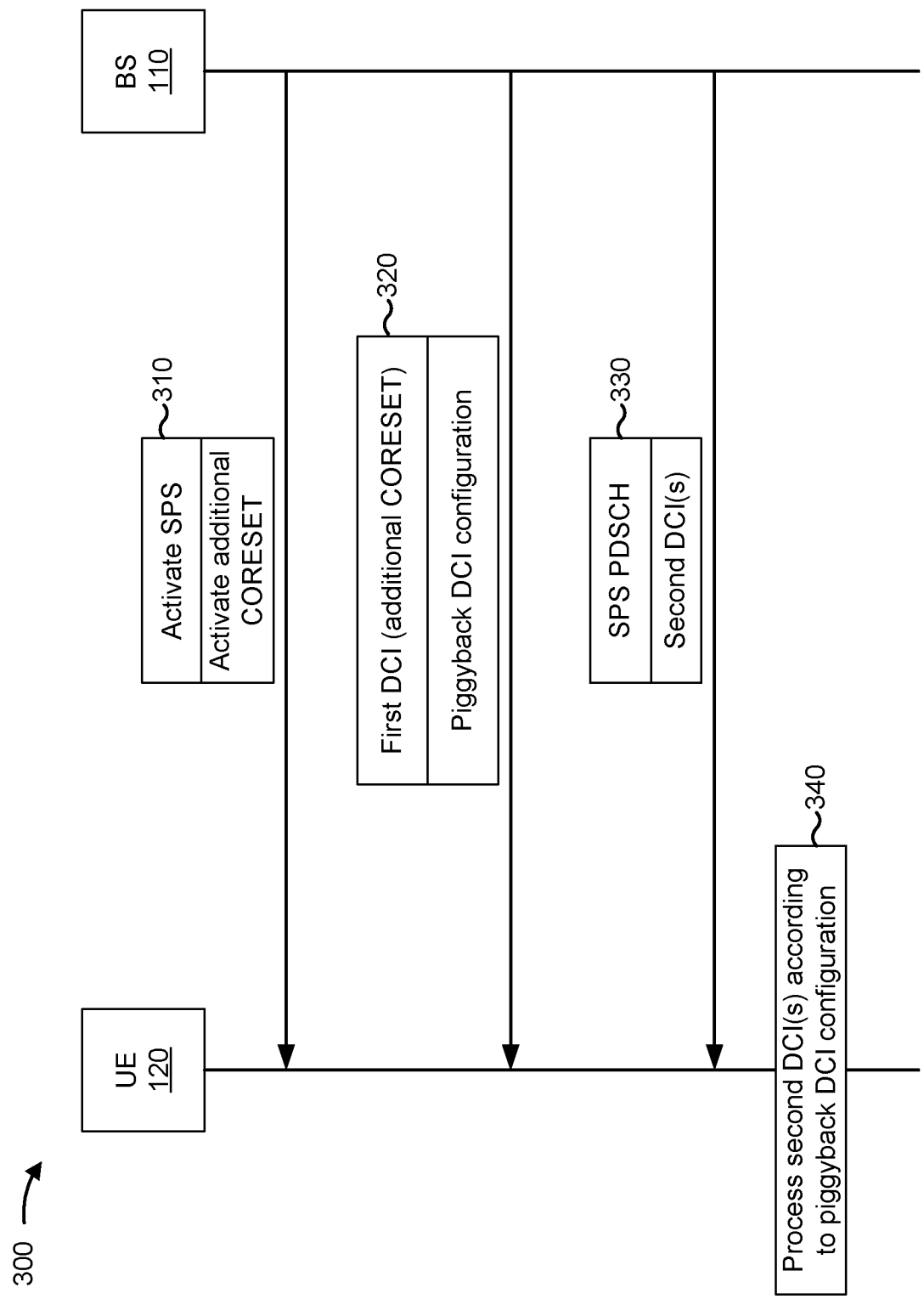
FIG. 3 is a diagram illustrating an example of configuration of a control resource set that carries a scheduling downlink control information (DCI) that schedules a piggyback DCI, in accordance with the present disclosure.

FIG. 3 is a diagram illustrating an example 300 of configuration of a control resource set that carries a scheduling DCI that schedules a piggyback DCI, in accordance with the present disclosure. As shown, example 300 includes a UE 120 and a BS 110. In some aspects, the UE 120 may be a reduced capability UE (e.g., a RedCap UE, an IoT UE, an MTC UE, and/or the like).

As shown by reference number 310, the BS 110 may provide, to the UE 120, information activating a CORESET and/or an SPS configuration. For example, the CORESET may be separate from a CORESET on which the message shown by reference number 310 is received, and is thus referred to as an additional CORESET. The additional CORESET may precede one or more SPS occasions (e.g., the SPS occasion shown by reference number 330) associated with one or more PDSCHs on which one or more DCIs are to be piggybacked. In some aspects, the activation of the SPS and/or the additional CORESET may be performed using DCI, a MAC-CE, RRC signaling, and/or the like. Additionally, or alternatively, the SPS and the additional CORESET may be configured and/or activated using different messages. For example, a first message may activate the SPS, and a second message may activate the additional CORESET.

In some aspects, the additional CORESET may be associated with a search space set. The search space set may include a search space within which the UE 120 is to receive the first DCI. The first DCI is shown by reference number 320, and may include a scheduling DCI and/or the like. In some aspects, the search space set and/or the CORESET may use a reduced configuration relative to a baseline or default search space set and/or CORESET. For example, the search space set may include a reduced number of PDCCH candidates (e.g., a single PDCCH candidate), a single aggregation level, and/or the like. Thus, a resource size of the search space set is reduced, and UE resource consumption associated with scanning for and receiving the first DCI is reduced.

In some aspects, the search space set may be associated with a periodicity. For example, the search space set may be associated with a same periodicity as the SPS occasions, meaning that one search space set occurs per SPS occasion. In such a case, each search space set may include a respective first DCI that indicates one or more second DCI on the corresponding SPS occasion. In some aspects, one search space set may correspond to multiple SPS occasions. For example, the periodicity of the search space set may be longer than the periodicity of the SPS occasions, meaning that a search space set may include a first DCI that schedules second DCI on multiple corresponding SPS occasions. In some aspects, the search space set may be aperiodic. In such a case, the search space set may be associated with one or more SPS occasions (e.g., a next SPS occasions, a next N SPS occasions, each SPS occasion until another first DCI is received or the SPS is deactivated, a pattern of SPS occasions such as every other SPS occasion or every third SPS occasion, and/or the like).

In some aspects, the additional CORESET may be activated or deactivated. For example, the additional CORESET and/or the search space set may be activated or deactivated using DCI, a MAC-CE, and/or the like. In this case, a first message (e.g., RRC signaling, a MAC-CE, DCI, and/or the like) may configure the additional CORESET and/or the search space set, a second message (e.g., RRC signaling, a MAC-CE, DCI, and/or the like) may activate the additional CORESET and/or the search space set, and a third message (e.g., RRC signaling, a MAC-CE, DCI, and/or the like) may deactivate the additional CORESET and/or the search space set. In some aspects, the first message and the second message may be combined.

In some aspects, the first DCI may be associated with a radio network temporary identifier (RNTI). For example, the first DCI may use the RNTI (e.g., a cyclic redundancy check of a PDCCH carrying the DCI may be scrambled using the RNTI). In some aspects, the RNTI may be a dedicated RNTI. The dedicated RNTI may indicate that the first DCI configures the one or more second DCIs, shown by reference number 330. For example, the UE may determine that the first DCI uses the dedicated RNTI, and may therefore determine that the first DCI configures second DCI as piggyback DCI.

In some aspects, the first DCI may indicate a number of component DCIs included in the one or more second DCIs. In some aspects, the first DCI may indicate a modulation order (e.g., a modulation and coding scheme (MCS) and/or the like) for the one or more second DCIs. In some aspects, the first DCI may indicate a beta offset of the one or more second DCIs. The beta offset may identify a DCI repetition factor for one or more PDSCHs of one or more SPS occasions.

In some aspects, the UE 120 may determine that the UE 120 has not received the first DCI. Additionally, or alternatively, the UE 120 may determine that the message shown by reference number 310, which configures the first DCI, is not received. In some aspects, based at least in part on determining that the first DCI is not received (e.g., is not present) or is not configured, the UE 120 may assume that the second DCI is not present, and may decode the PDSCH on the SPS occasion on the assumption that no piggybacked DCI is present. In some aspects, based at least in part on determining that the first DCI is not received or is not configured, the UE 120 may use a setting (e.g., a preconfigured setting, a default setting, and/or the like) to receive and/or process the second DCI. In some aspects, the setting may be configured by a previous first DCI, MAC-CE, or piggybacked DCI. In some aspects, the UE 120 may receive signaling indicating whether to assume that the second DCI is not present or to use the setting to receive and/or process the second DCI. In some aspects, the UE 120 may be preconfigured or specified (e.g., based at least in part on a wireless communication standard) with information indicating whether to assume that the second DCI is not present or to use the setting to receive and/or process the second DCI. Providing signaling indicating the technique to be used may allow for increased flexibility in the UE 120's processing of missed first DCI, whereas preconfiguring or specifying the technique to be used may reduce signaling overhead.

As shown by reference number 330, the BS 110 may transmit the one or more second DCIs to UE 120 on one or more SPS PDSCHs. As shown by reference number 340, the UE 120 may process (e.g., scan for, receive, decode, etc.) the one or more second DCIs according to the piggyback DCI configuration. For example, the UE 120 may decode the PDSCH and identify the one or more second DCIs according to the piggyback DCI configuration. In this way, the BS 110 may indicate, to the UE 120, configurations for one or more second DCIs in one or more SPS PDSCHs, thereby enabling the UE 120 to more efficiently identify and process the one or more second DCIs. By using an activated CORESET and/or search space set that is associated with a reduced configuration, the BS 110 may reduce resource usage and improve flexibility associated with indicating the configurations for the one or more second DCIs to the UE 120.

As indicated above, FIG. 3 is provided as an example. Other examples may differ from what is described with respect to FIG. 3.

Figure 4:
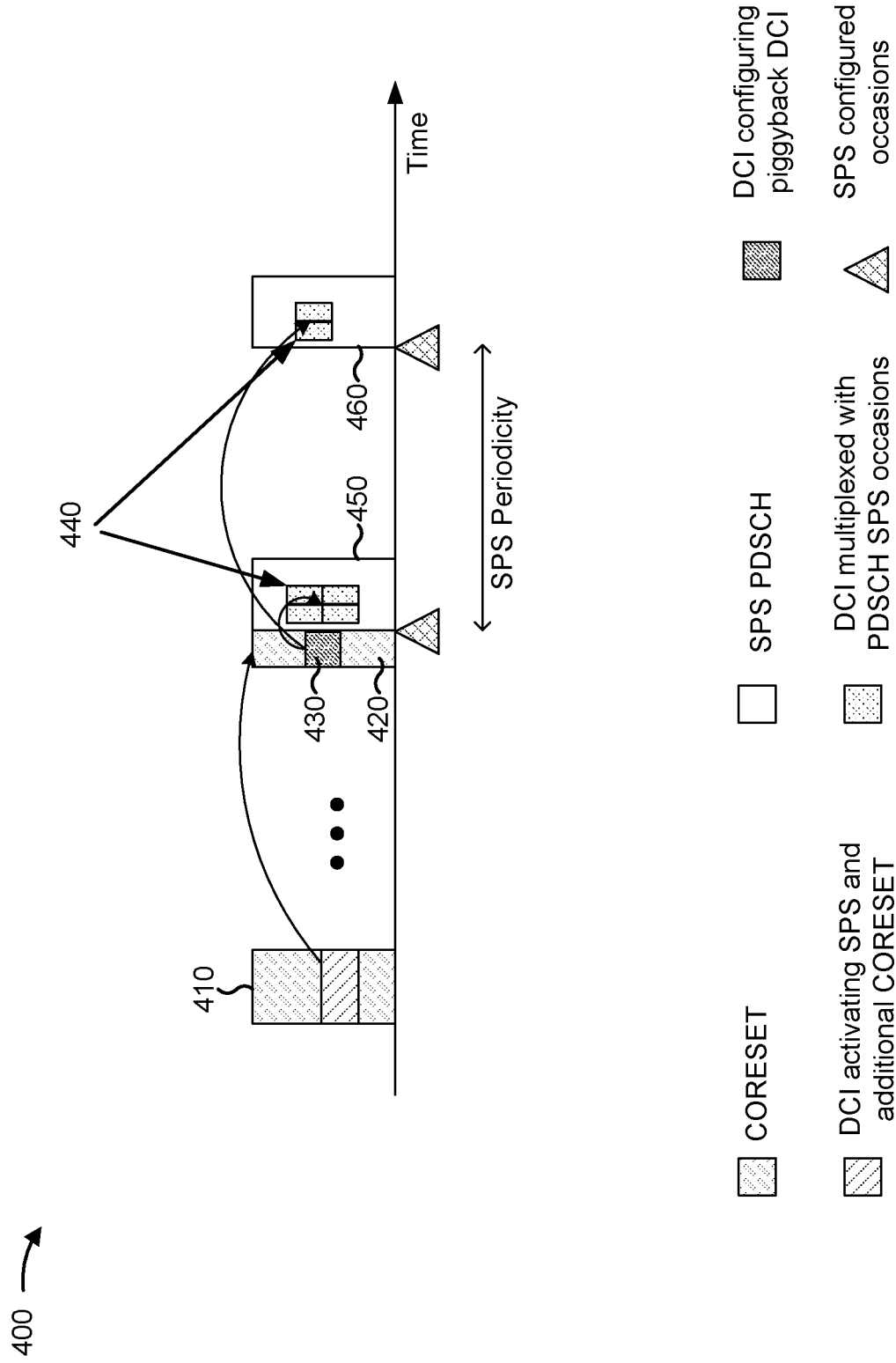
FIG. 4 is a diagram illustrating an example of a resource configuration associated with the example of FIG. 3.

FIG. 4 is a diagram illustrating an example 400 associated with the example 300 of FIG. 3. Example 400 shows transmissions from a BS 110 to a UE 120. The horizontal axis in FIG. 4 represents time.

As shown in FIG. 4, and by reference number 410, the BS 110 may transmit DCI activating the SPS configuration and the additional CORESET. This corresponds to the message shown by reference number 310 in FIG. 3. The additional CORESET is shown by reference number 420. As shown by reference number 430, the BS 110 may transmit first DCI in the additional CORESET. This corresponds to the first DCI shown by reference number 320 in FIG. 3. The first DCI may schedule one or more piggyback DCIs, such as those shown by reference number 440. The one or more piggyback DCIs correspond to the second DCI shown by reference number 330 in FIG. 3. As shown, the two SPS occasions 450 and 460 are associated with different numbers of component DCIs (e.g., 4 component DCIs in the SPS occasion 450 and 2 component DCIs in the SPS occasion 460).

As indicated above, FIG. 4 is provided as an example. Other examples may differ from what is described with respect to FIG. 4.

Figure 5:
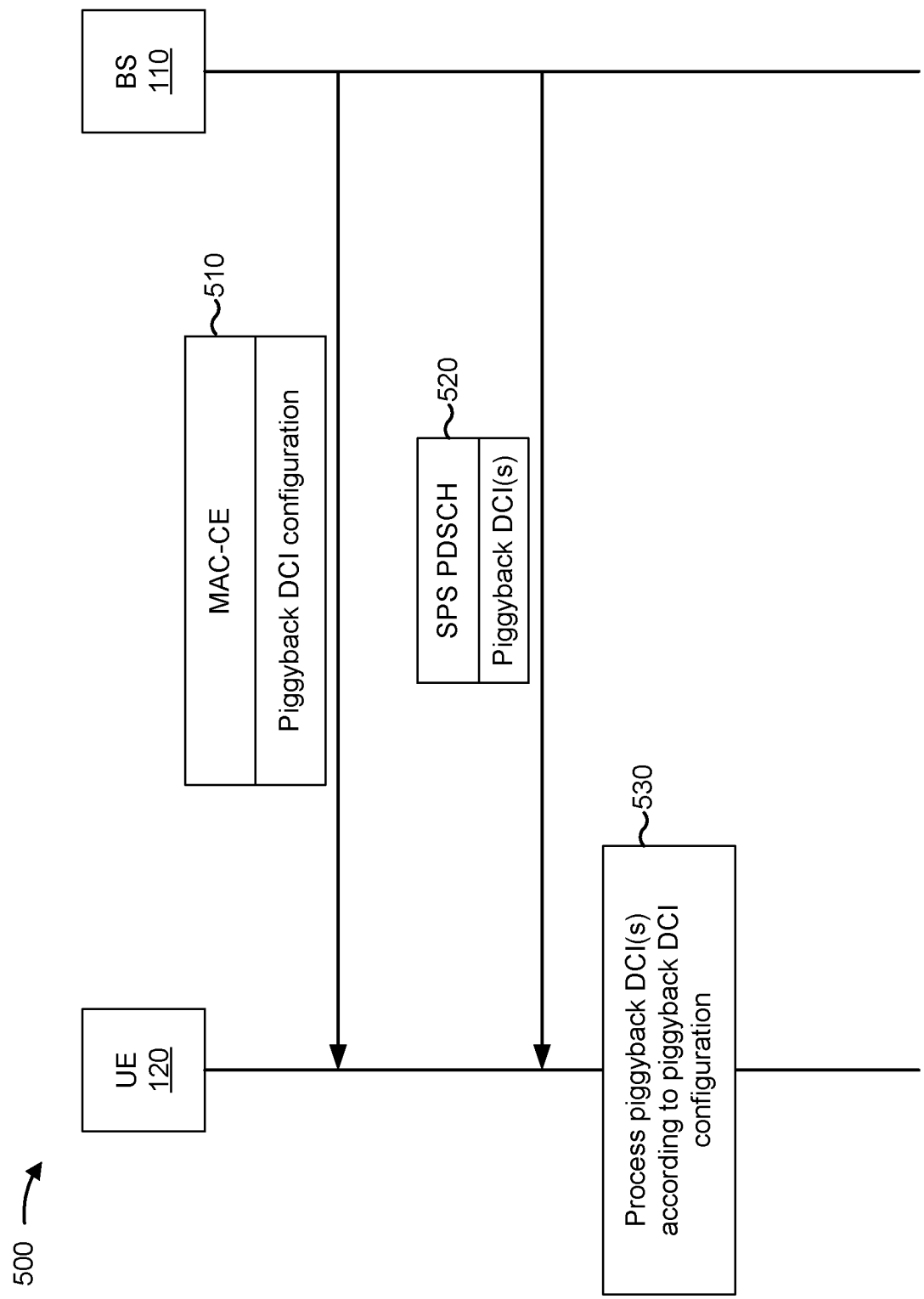
FIG. 5 is a diagram illustrating an example of using medium access control (MAC) signaling to schedule a piggyback DCI, in accordance with the present disclosure.

FIG. 5 is a diagram illustrating an example 500 of using medium access control (MAC) signaling to schedule a piggyback DCI, in accordance with the present disclosure. As shown, FIG. 5 includes a UE 120 and a BS 110.

As shown in FIG. 5, and by reference number 510, the BS 110 may transmit, to the UE 120, a MAC-CE that indicates a piggyback DCI configuration. For example, the MAC-CE may include part or all of the information indicated by the first DCI shown by reference number 320 of FIG. 3, such as a number of component DCIs of a piggyback DCI, a modulation order of the piggyback DCI, a beta offset of the piggyback DCI, and/or the like. In some aspects, the piggyback DCI configuration may be provided in DCI that is carried using the MAC-CE command. By providing the piggyback DCI configuration using the MAC-CE, communication resources and overhead associated with the UE are reduced relative to providing the piggyback DCI on a PDCCH monitoring occasion. In some aspects, the piggyback DCI configuration may be provided in DCI that is carried using the MAC-CE command.

As shown by reference number 520, the UE 120 may receive one or more piggyback DCI on one or more SPS PDSCHs. As shown by reference number 530, the UE 210 may process (e.g., receive, scan for, decode, etc.) the one or more piggyback DCI according to the piggyback DCI configuration, which is described in more detail in connection with FIG. 3. In some aspects, the MAC-CE, or DCI that is carried by the MAC-CE, may use a dedicated RNTI, as described elsewhere herein. In some aspects, the UE 120 may determine that the MAC-CE is not received (e.g., that DCI carried in the MAC-CE is not received) and may process the PDSCH based at least in part on an assumption that the PDSCH does not include DCI, or may process the PDSCH based at least in part on a baseline or default configuration, as described elsewhere herein. For example, the UE 120 may apply one or more of the above techniques based at least in part on an indication of which technique to use, or based at least in part on a preconfiguration or specification associated with the UE 120. In some aspects, the UE 120 may apply the piggyback DCI configuration for a single SPS occasion, or for multiple SPS occasions (e.g., a next N occasions after the piggyback DCI configuration received, a set of occasions based at least in part on a pattern, and/or the like).

As indicated above, FIG. 5 is provided as an example. Other examples may differ from what is described with respect to FIG. 5.

Figure 6:
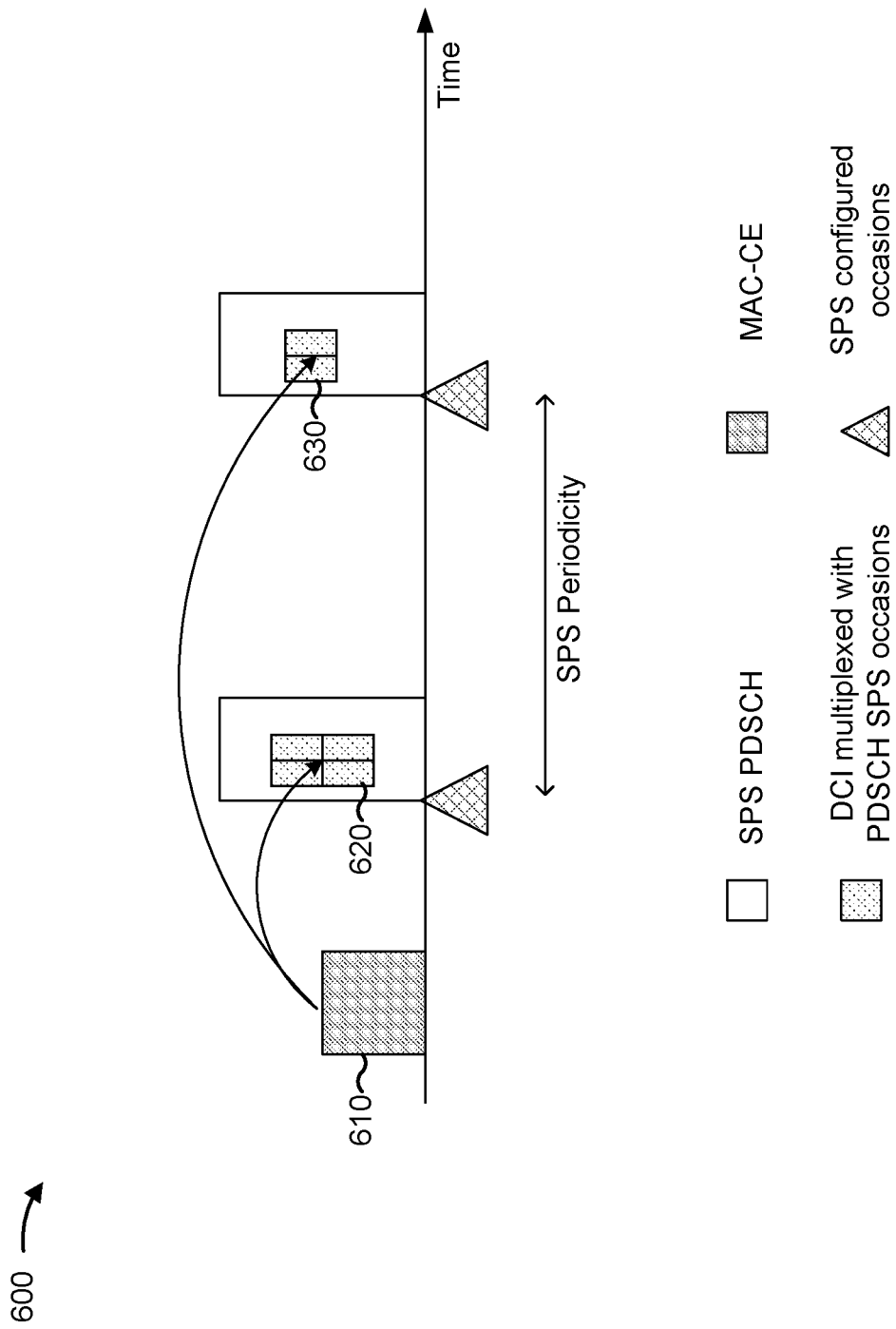
FIG. 6 is a diagram illustrating an example of a resource configuration associated with the example of FIG. 5.

FIG. 6 is a diagram illustrating an example 600 associated with the example 500 of FIG. 5. Example 600 shows transmissions from a BS 110 to a UE 120. The horizontal axis in FIG. 6 represents time. As shown by reference number 610, the BS 110 may transmit a MAC-CE to the UE 120. As further shown, the MAC-CE may schedule a first set of piggyback DCI 620 on a first SPS occasion and a second set of piggyback DCI 630 on a second SPS occasion. For example, the MAC-CE may correspond to the MAC-CE of FIG. 5, and the DCI 620/630 may correspond to the second DCI of FIG. 5. In some aspects, the MAC-CE may carry scheduling DCI that schedules the DCI 620/630 (not shown), such as the first DCI of FIG. 3.

As indicated above, FIG. 6 is provided as an example. Other examples may differ from what is described with respect to FIG. 6.

Figure 7:
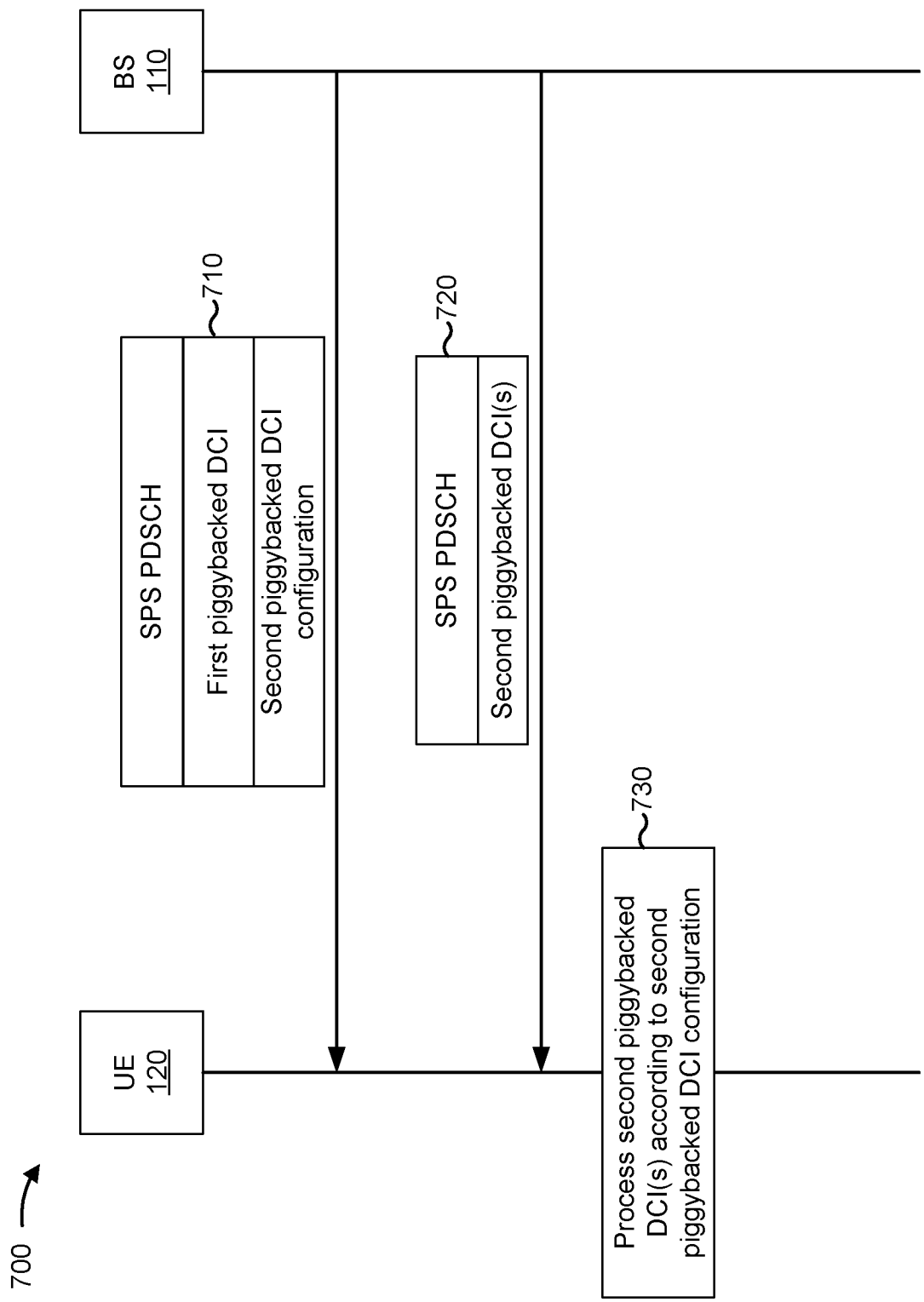
FIG. 7 is a diagram illustrating an example of scheduling a piggyback DCI using another piggyback DCI, in accordance with the present disclosure.

FIG. 7 is a diagram illustrating an example 700 of scheduling a piggyback DCI using another piggyback DCI, in accordance with the present disclosure. As shown, example 700 includes a UE 120 and a BS 110.

As shown by reference number 710, the BS 110 may provide a first piggybacked DCI to the UE 120. For example, the first piggybacked DCI may be multiplexed on an SPS PDSCH. As further shown, the first piggybacked DCI may include a configuration for a second piggybacked DCI. For example, the configuration for the second piggybacked DCI may include part of or all of the information provided by the first DCI and/or the MAC-CE. As shown by reference number 520, the UE 120 may receive one or more second piggybacked DCIs on an SPS PDSCH. As shown by reference number 730, the UE 120 may process the one or more second piggybacked DCI according to the configuration for the second piggybacked DCI, as described in more detail elsewhere herein. In some aspects, the first piggybacked DCI may use a dedicated RNTI, as described elsewhere herein. In some aspects, the UE 120 may determine that the first piggybacked DCI is not received and may process the SPS PDSCH based at least in part on an assumption that the SPS PDSCH does not include DCI, or may process the SPS PDSCH based at least in part on a baseline or default configuration, as described elsewhere herein. For example, the UE 120 may apply one or more of the above techniques based at least in part on an indication of which technique to use, or based at least in part on a preconfiguration or specification associated with the UE 120. In some aspects, the UE 120 may apply the second piggybacked DCI configuration for a single SPS occasion, or for multiple SPS occasions (e.g., a next N occasions after the second piggybacked DCI configuration received, a set of occasions based at least in part on a pattern, and/or the like). By providing the configuration for the second piggybacked DCI configuration on a first piggybacked DCI configuration, resources of the UE 120 that would be used to monitor communications outside of the SPS PDSCH are conserved.

As indicated above, FIG. 7 is provided as an example. Other examples may differ from what is described with respect to FIG. 7.

Figure 8:
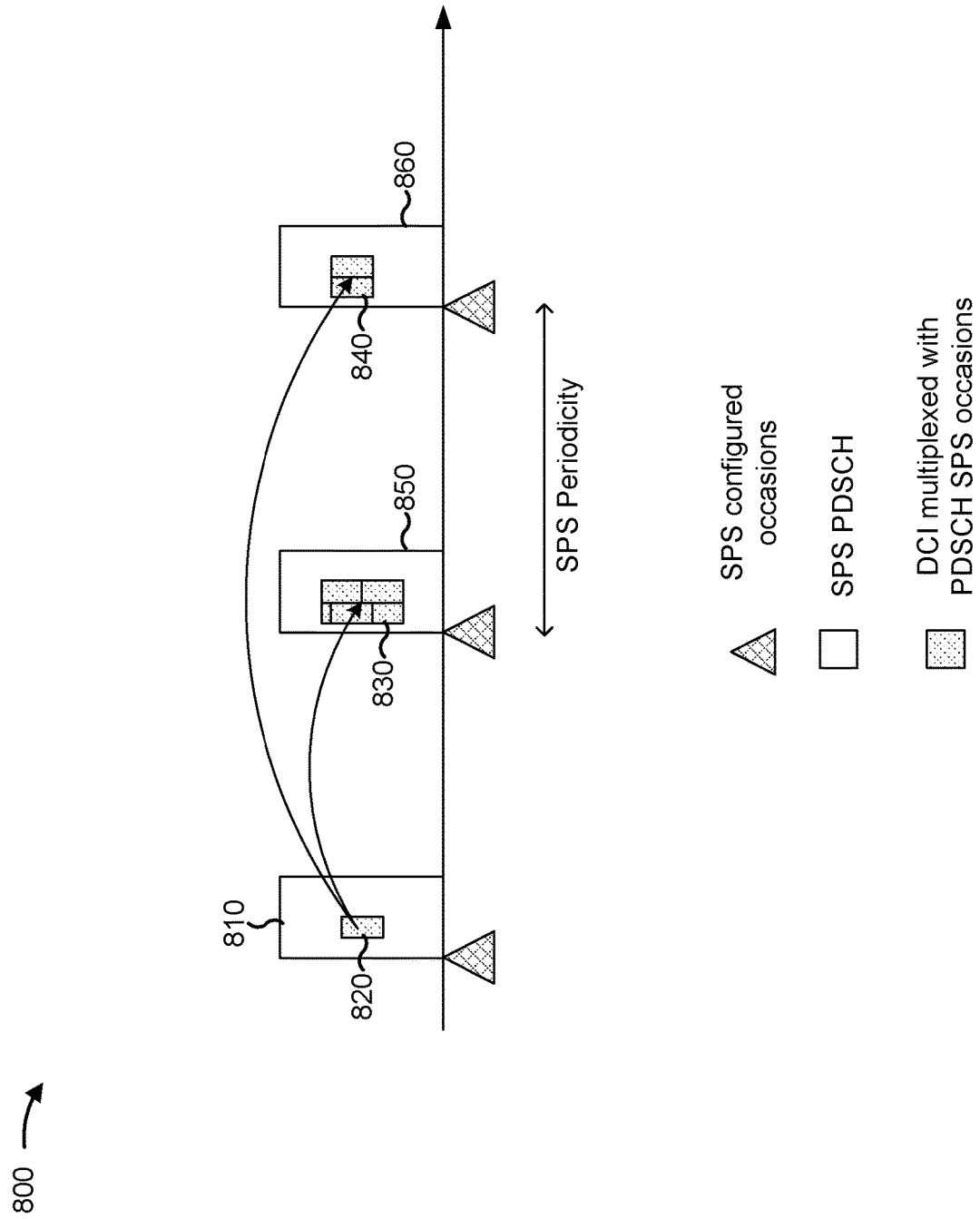
FIG. 8 is a diagram illustrating an example of a resource configuration associated with the example of FIG. 7.

FIG. 8 is a diagram illustrating an example 800 associated with the example 700 of FIG. 7. A first SPS PDSCH is shown by reference number 810. As shown, the first SPS PDSCH includes a first piggybacked DCI 820. The first piggybacked DCI 820 may correspond to the first piggybacked DCI of FIG. 7. As further shown, the first piggybacked DCI 820 schedules second piggybacked DCI 830 and 840 in second and third SPS PDSCHs 850 and 860, respectively. The second piggybacked DCIs 830 and 840 may correspond to the second piggybacked DCI 720 of FIG. 7.

As indicated above, FIG. 8 is provided as an example. Other examples may differ from what is described with respect to FIG. 8.

Figure 9:
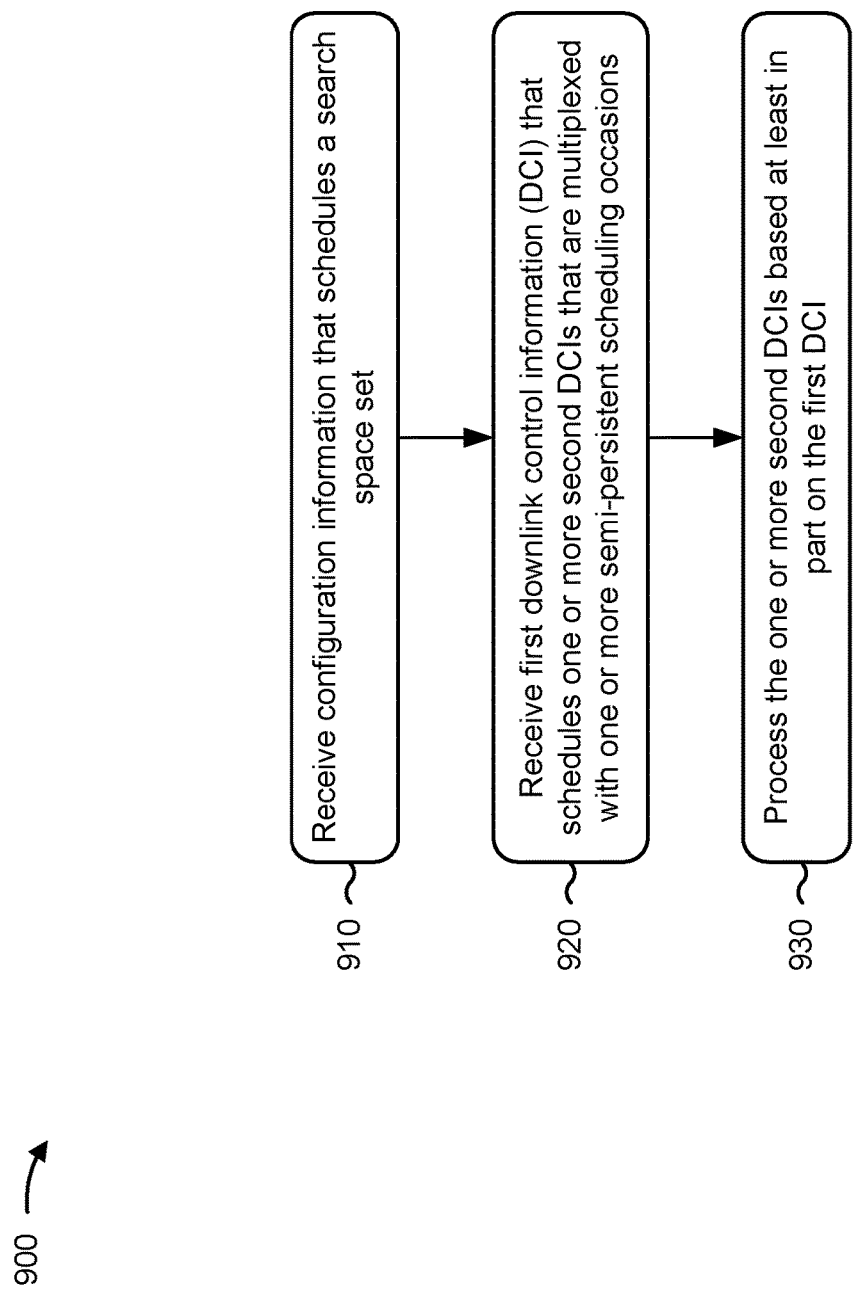
FIG. 9 is a diagram illustrating an example process performed, for example, by a user equipment, in accordance with the present disclosure.

FIG. 9 is a diagram illustrating an example process 900 performed, for example, by a UE, in accordance with the present disclosure. Example process 900 is an example where the UE (e.g., UE 120 and/or the like) performs operations associated with configuration of piggyback downlink control information on a semi-persistent scheduling resource.

As shown in FIG. 9, in some aspects, process 900 may include receiving configuration information that schedules a search space set (block 910). For example, the UE (e.g., using antenna 252, DEMOD 254, MIMO detector 256, receive processor 258, controller/processor 280, and/or the like) may receive configuration information that schedules a search space set, as described above.

As further shown in FIG. 9, in some aspects, process 900 may include receiving, on the search space set, first DCI that schedules or configures one or more second DCIs that are multiplexed with one or more semi-persistent scheduling occasions (block 920). For example, the UE (e.g., using antenna 252, DEMOD 254, MIMO detector 256, receive processor 258, controller/processor 280, and/or the like) may receive, on the search space set, first DCI that schedules or configures one or more second DCIs that are multiplexed with one or more semi-persistent scheduling occasions, as described above.

As further shown in FIG. 9, in some aspects, process 900 may include processing the one or more second DCIs based at least in part on the first DCI (block 930). For example, the UE (e.g., using antenna 252, DEMOD 254, MIMO detector 256, receive processor 258, controller/processor 280, and/or the like) may process the one or more second DCIs based at least in part on the first DCI, as described above.

Process 900 may include additional aspects, such as any single aspect or any combination of aspects described below and/or in connection with one or more other processes described elsewhere herein.

In a first aspect, the search space set includes a single control channel candidate and a single aggregation level.

In a second aspect, alone or in combination with the first aspect, the search space set occurs before the one or more semi-persistent scheduling occasions.

In a third aspect, alone or in combination with one or more of the first and second aspects, the configuration information identifies a control resource set that includes the search space set.

In a fourth aspect, alone or in combination with one or more of the first through third aspects, the search space set is one of a plurality of search space sets, configured by the configuration information, that occur periodically.

In a fifth aspect, alone or in combination with one or more of the first through fourth aspects, a periodicity of the plurality of search space sets is less frequent than a periodicity associated with the one or more semi-persistent scheduling occasions.

In a sixth aspect, alone or in combination with one or more of the first through fifth aspects, the first DCI includes scheduling information for a plurality of second DCIs on respective semi-persistent scheduling occasions.

In a seventh aspect, alone or in combination with one or more of the first through sixth aspects, a periodicity of the plurality of search space sets is equal to a periodicity associated with the one or more semi-persistent scheduling occasions.

In an eighth aspect, alone or in combination with one or more of the first through seventh aspects, the configuration information is received in RRC signaling or DCI that activates the one or more semi-persistent scheduling occasions.

In a ninth aspect, alone or in combination with one or more of the first through eighth aspects, process 900 includes receiving DCI or MAC signaling activating or deactivating the search space set, wherein is receiving the first DCI is based at least in part on the DCI or MAC signaling activating or deactivating the search space set.

In a tenth aspect, alone or in combination with one or more of the first through ninth aspects, the first DCI uses a dedicated radio network temporary identifier that indicates that the first DCI is associated with scheduling the one or more second DCIs.

In an eleventh aspect, alone or in combination with one or more of the first through tenth aspects, the first DCI indicates at least one of: a number of component DCIs in the one or more second DCIs, a modulation order for the one or more second DCIs, or a beta offset of the one or more second DCIs.

In a twelfth aspect, alone or in combination with one or more of the first through eleventh aspects, process 900 includes determining that another first DCI is not received or is not configured; and processing a downlink channel on a corresponding semi-persistent scheduling occasion as if no second DCI is multiplexed with the downlink channel based at least in part on determining that the other first DCI is not received or is not configured.

In a thirteenth aspect, alone or in combination with one or more of the first through twelfth aspects, process 900 includes determining that another first DCI is not received or is not configured; and processing a second DCI corresponding to the first DCI in accordance with a configured setting based at least in part on determining that the other first DCI is not received or is not configured.

In a fourteenth aspect, alone or in combination with one or more of the first through thirteenth aspects, process 900 includes receiving signaling indicating a rule for processing the one or more second DCIs in case the first DCI is not received or is not configured.

In a fifteenth aspect, alone or in combination with one or more of the first through fourteenth aspects, the first DCI configures a second DCI for a single semi-persistent scheduling occasion.

In a sixteenth aspect, alone or in combination with one or more of the first through fifteenth aspects, the first DCI configures respective second DCIs for multiple semi-persistent scheduling occasions.

In a seventeenth aspect, alone or in combination with one or more of the first through sixteenth aspects, the first DCI is used for a number of semi-persistent scheduling occasions after the first DCI is received.

In an eighteenth aspect, alone or in combination with one or more of the first through seventeenth aspects, the first DCI is used for semi-persistent scheduling occasions according to a configured pattern.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
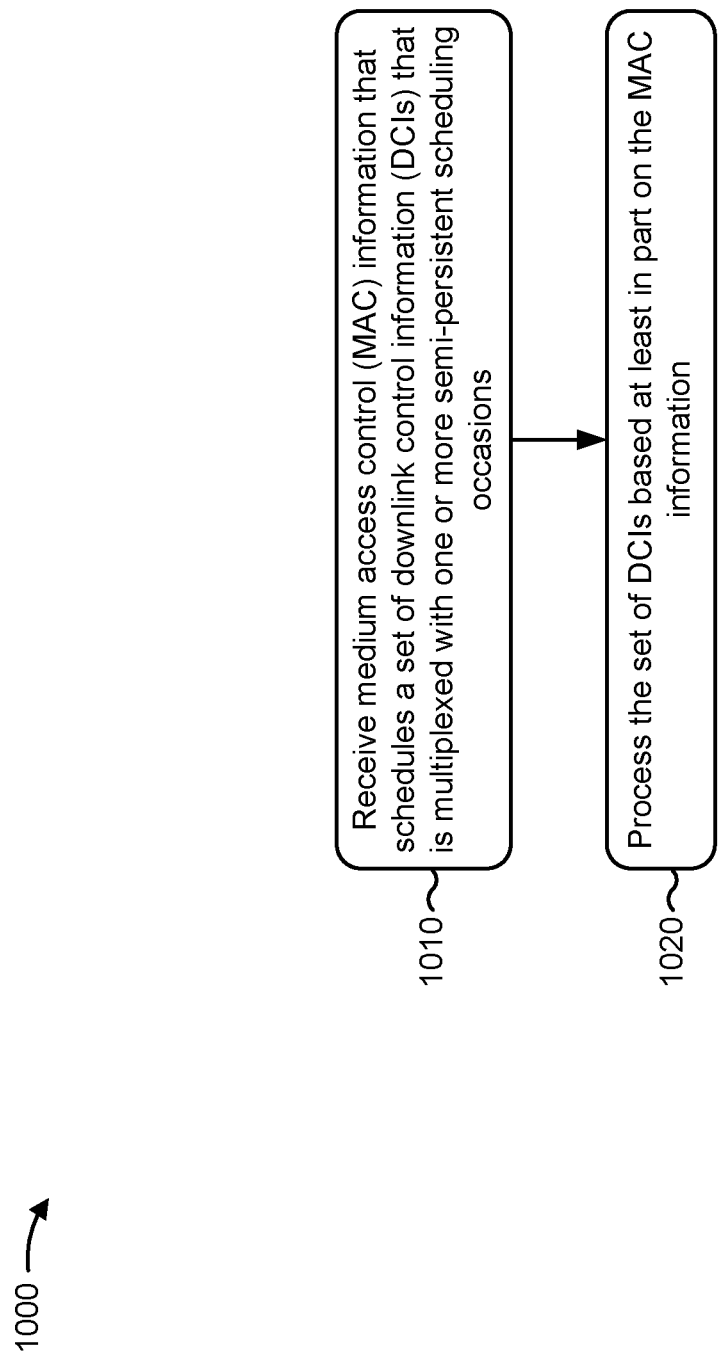
FIG. 10 is a diagram illustrating an example process performed, for example, by a user equipment, in accordance with the present disclosure.

FIG. 10 is a diagram illustrating an example process 1000 performed, for example, by a UE, in accordance with the present disclosure. Example process 1000 is an example where the UE (e.g., UE 120 and/or the like) performs operations associated with configuration of piggyback downlink control information on a semi-persistent scheduling resource.

As shown in FIG. 10, in some aspects, process 1000 may include receiving MAC information that schedules or configures a set of DCIs that are multiplexed with one or more semi-persistent scheduling occasions (block 1010). For example, the UE (e.g., using antenna 252, DEMOD 254, MIMO detector 256, receive processor 258, controller/processor 280, and/or the like) may receive MAC information that schedules or configures a set of DCIs that are multiplexed with one or more semi-persistent scheduling occasions, as described above.

As further shown in FIG. 10, in some aspects, process 1000 may include processing the set of DCIs based at least in part on the MAC information (block 1020). For example, the UE (e.g., using antenna 252, DEMOD 254, MIMO detector 256, receive processor 258, controller/processor 280, and/or the like) may process the set of DCIs based at least in part on the MAC information, as described above.

Process 1000 may include additional aspects, such as any single aspect or any combination of aspects described below and/or in connection with one or more other processes described elsewhere herein.

In a first aspect, the MAC information indicates at least one of: a number of component DCIs in the set of DCIs, a modulation order for the set of DCIs, or a beta offset of the set of DCIs.

In a second aspect, alone or in combination with the first aspect, the MAC information is first MAC information, and the method further comprises: determining that second MAC information is not received or is not configured, and processing a downlink channel on a corresponding semi-persistent scheduling occasion as if no DCI is multiplexed with the downlink channel based at least in part on determining that the second MAC information is not received or is not configured.

In a third aspect, alone or in combination with one or more of the first and second aspects, the MAC information is first MAC information, and the method further comprises: determining that second MAC information is not received or is not configured, and processing a DCI corresponding to the second MAC information in accordance with a configured setting based at least in part on determining that the second MAC information is not received or is not configured.

In a fourth aspect, alone or in combination with one or more of the first through third aspects, process 1000 includes receiving signaling indicating a rule for processing the set of DCIs in case the MAC information is not received or is not configured.

In a fifth aspect, alone or in combination with one or more of the first through fourth aspects, the MAC information configures the set of DCIs for a single semi-persistent scheduling occasion.

In a sixth aspect, alone or in combination with one or more of the first through fifth aspects, the MAC information configures respective DCIs for multiple semi-persistent scheduling occasions.

In a seventh aspect, alone or in combination with one or more of the first through sixth aspects, the MAC information is used for a number of semi-persistent scheduling occasions after the MAC information is received.

In an eighth aspect, alone or in combination with one or more of the first through seventh aspects, the MAC information is used for semi-persistent scheduling occasions according to a configured pattern.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
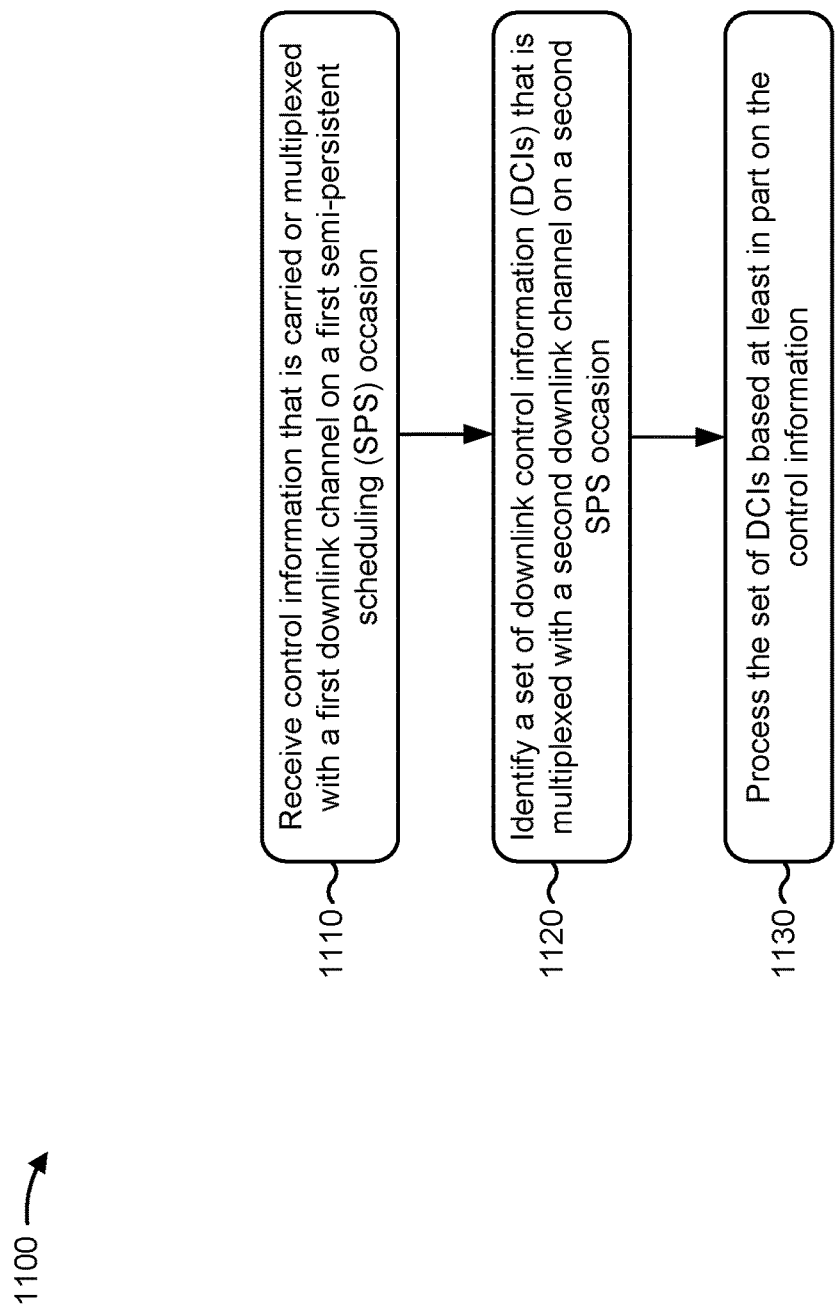
FIG. 11 is a diagram illustrating an example process performed, for example, by a user equipment, in accordance with the present disclosure.

FIG. 11 is a diagram illustrating an example process 1100 performed, for example, by a UE, in accordance with the present disclosure. Example process 1100 is an example where the UE (e.g., UE 120 and/or the like) performs operations associated with configuration of piggyback downlink control information on a semi-persistent scheduling resource.

As shown in FIG. 11, in some aspects, process 1100 may include receiving control information that is carried or multiplexed with a first downlink channel on a first semi-persistent scheduling (SPS) occasion (block 1110). For example, the UE (e.g., using antenna 252, DEMOD 254, MIMO detector 256, receive processor 258, controller/processor 280, and/or the like) may receive control information that is carried or multiplexed with a first downlink channel on a first semi-persistent scheduling (SPS) occasion, as described above.

As further shown in FIG. 11, in some aspects, process 1100 may include identifying, based at least in part on the control information, a set of DCIs that are multiplexed with a second downlink channel on a second SPS occasion (block 1120). For example, the UE (e.g., using antenna 252, DEMOD 254, MIMO detector 256, receive processor 258, controller/processor 280, and/or the like) may identify, based at least in part on the control information, a set of DCIs that are multiplexed with a second downlink channel on a second SPS occasion, as described above.

As further shown in FIG. 11, in some aspects, process 1100 may include processing the set of DCIs based at least in part on the control information (block 1130). For example, the UE (e.g., using antenna 252, DEMOD 254, MIMO detector 256, receive processor 258, controller/processor 280, and/or the like) may process the set of DCIs based at least in part on the control information, as described above.

Process 1100 may include additional aspects, such as any single aspect or any combination of aspects described below and/or in connection with one or more other processes described elsewhere herein.

In a first aspect, the control information comprises DCI.

In a second aspect, alone or in combination with the first aspect, the control information comprises medium access control information.

In a third aspect, alone or in combination with one or more of the first and second aspects, the control information uses a dedicated radio network temporary identifier that indicates that the control information is associated with scheduling the set of DCIs.

In a fourth aspect, alone or in combination with one or more of the first through third aspects, the control information indicates at least one of: a number of component DCIs in the set of DCIs, a modulation order for the set of DCIs, or a beta offset of the set of DCIs.

In a fifth aspect, alone or in combination with one or more of the first through fourth aspects, the control information is first control information, and the method further comprises: determining that second control information is not received or is not configured, and processing a downlink channel on a corresponding semi-persistent scheduling occasion as if no DCI is multiplexed with the downlink channel based at least in part on determining that the second control information is not received or is not configured.

In a sixth aspect, alone or in combination with one or more of the first through fifth aspects, the control information is first control information, and the method further comprises: determining that second control information is not received or is not configured, and processing a DCI corresponding to the second control information in accordance with a configured setting based at least in part on determining that the second control information is not received or is not configured.

In a seventh aspect, alone or in combination with one or more of the first through sixth aspects, process 1100 includes receiving signaling indicating a rule for processing the set of DCIs in case the control information is not received or is not configured.

In an eighth aspect, alone or in combination with one or more of the first through seventh aspects, the control information configures the set of DCIs for a single semi-persistent scheduling occasion.

In a ninth aspect, alone or in combination with one or more of the first through eighth aspects, the control information configures respective DCIs for multiple semi-persistent scheduling occasions.

In a tenth aspect, alone or in combination with one or more of the first through ninth aspects, the control information is used for a number of semi-persistent scheduling occasions after the control information is received.

In an eleventh aspect, alone or in combination with one or more of the first through tenth aspects, the control information is used for semi-persistent scheduling occasions according to a configured pattern.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: receiving configuration information that schedules a search space set; receiving, on the search space set, first downlink control information (DCI) that schedules or configures one or more second DCIs that are multiplexed with one or more semi-persistent scheduling occasions; and processing the one or more second DCIs based at least in part on the first DCI.

Aspect 2: The method of Aspect 1, wherein the search space set includes a single control channel candidate and a single aggregation level.

Aspect 3: The method of any of Aspects 1-2, wherein the search space set occurs before the one or more semi-persistent scheduling occasions.

Aspect 4: The method of any of Aspects 1-3, wherein the search space set is one of a plurality of search space sets, configured by the configuration information, that occur periodically.

Aspect 5: The method of Aspect 4, wherein a periodicity of the plurality of search space sets is less frequent than a periodicity associated with the one or more semi-persistent scheduling occasions, wherein the first DCI includes scheduling information for a plurality of second DCIs on respective semi-persistent scheduling occasions.

Aspect 7: The method of any of Aspects 1-6, further comprising: receiving DCI or medium access control (MAC) signaling activating or deactivating the search space set, wherein receiving the first DCI is based at least in part on the DCI or MAC signaling activating or deactivating the search space set.

Aspect 8: The method of any of Aspects 1-7, wherein the first DCI uses a dedicated radio network temporary identifier that indicates that the first DCI is associated with scheduling the one or more second DCIs.

Aspect 9: The method of any of Aspects 1-8, wherein the first DCI indicates at least one of: a number of component DCIs in the one or more second DCIs, a modulation order for the one or more second DCIs, or a beta offset of the one or more second DCIs.

Aspect 10: The method of any of Aspects 1-9, further comprising: determining that another first DCI is not received or is not configured; and processing a downlink channel on a corresponding semi-persistent scheduling occasion as if no second DCI is multiplexed with the downlink channel based at least in part on determining that the other first DCI is not received or is not configured.

Aspect 11: The method of any of Aspects 1-10, further comprising: determining that another first DCI is not received or is not configured; and processing a second DCI corresponding to the first DCI in accordance with a configured setting based at least in part on determining that the other first DCI is not received or is not configured.

Aspect 12: The method of any of Aspects 1-11, wherein the first DCI configures one or more second DCI for one or more corresponding semi-persistent scheduling occasions.

Aspect 13: A method of wireless communication performed by a user equipment (UE), comprising: receiving medium access control (MAC) information that schedules or configures a set of downlink control information (DCIs) that are multiplexed with one or more semi-persistent scheduling occasions; and processing the set of DCIs based at least in part on the MAC information.

Aspect 14: The method of Aspect 13, wherein the MAC information indicates at least one of: a number of component DCIs in the set of DCIs, a modulation order for the set of DCIs, or a beta offset of the set of DCIs.

Aspect 15: The method of any of Aspects 13-14, wherein the MAC information is first MAC information, and wherein the method further comprises: determining that second MAC information is not received or is not configured; and processing a downlink channel on a corresponding semi-persistent scheduling occasion as if no DCI is multiplexed with the downlink channel based at least in part on determining that the second MAC information is not received or is not configured.

Aspect 16: The method of any of Aspects 13-15, further comprising: receiving signaling indicating a rule for processing the set of DCIs in case the MAC information is not received or is not configured.

Aspect 17: The method of any of Aspects 13-16, wherein the MAC information configures the set of DCIs for one or more corresponding semi-persistent scheduling occasion.

Aspect 18: The method of any of Aspects 13-17, wherein the MAC information configures respective DCIs for multiple semi-persistent scheduling occasions.

Aspect 19: A method of wireless communication performed by a user equipment (UE), comprising: receiving control information that is carried or multiplexed with a first downlink channel on a first semi-persistent scheduling (SPS) occasion; identifying, based at least in part on the control information, a set of downlink control information (DCIs) that are multiplexed with a second downlink channel on a second SPS occasion; and receiving the set of DCIs based at least in part on the control information.

Aspect 20: The method of Aspect 19, wherein the control information comprises one of DCI or medium access control information.

Aspect 22: The method of any of Aspects 19-20, wherein the control information configures the set of DCIs for one or more corresponding semi-persistent scheduling occasions.

Aspect 23: The method of any of Aspects 19-21, wherein the control information configures respective DCIs for multiple semi-persistent scheduling occasions.

Aspect 24: An apparatus for wireless communication at a device, comprising a processor; memory coupled with the processor; and instructions stored in the memory and executable by the processor to cause the apparatus to perform the method of one or more Aspects of Aspects 1-23.

Aspect 25: A device for wireless communication, comprising a memory and one or more processors coupled to the memory, the memory and the one or more processors configured to perform the method of one or more Aspects of Aspects 1-23.

Aspect 26: An apparatus for wireless communication, comprising at least one means for performing the method of one or more Aspects of Aspects 1-23.

Aspect 27: A non-transitory computer-readable medium storing code for wireless communication, the code comprising instructions executable by a processor to perform the method of one or more Aspects of Aspects 1-23.

Aspect 28: A non-transitory computer-readable medium storing a set of instructions for wireless communication, the set of instructions comprising one or more instructions that, when executed by one or more processors of a device, cause the device to perform the method of one or more Aspects of Aspects 1-23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI; and
    wherein the search space set includes a single control channel candidate and a single aggregation level.

2. The method of claim 1, wherein the search space set occurs before the one or more semi-persistent scheduling occasions.

3. The method of claim 1, wherein the search space set is one of a plurality of search space sets, configured by the configuration information, that occur periodically.

4. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI;
    wherein the search space set is one of a plurality of search space sets, configured by the configuration information, that occur periodically;
    wherein a periodicity of the plurality of search space sets is less frequent than a periodicity associated with the one or more semi-persistent scheduling occasions; and
    wherein the first DCI includes scheduling information for a plurality of second DCIs on respective semi-persistent scheduling occasions.

5. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI; and
    receiving DCI or medium access control (MAC) signaling activating or deactivating the search space set, wherein receiving the first DCI is based at least in part on the DCI or MAC signaling activating or deactivating the search space set.

6. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI; and
    wherein the first DCI uses a dedicated radio network temporary identifier that indicates that the first DCI is associated with scheduling the one or more second DCIs.

7. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI; and
    wherein the first DCI indicates at least one of:
    a number of component DCIs in the one or more second DCIs,
    a modulation order for the one or more second DCIs, or
    a beta offset of the one or more second DCIs.

8. A method of wireless communication performed by a user equipment (UE), comprising:
    receiving configuration information that schedules a search space set;
    receiving, on the search space set, first downlink control information (DCI) that schedules or configures one or more second DCIs that are multiplexed with one or more semi-persistent scheduling occasions;
    processing the one or more second DCIs based at least in part on the first DCI;
    determining that another first DCI is not received or is not configured; and processing a downlink channel on a corresponding semi-persistent scheduling occasion as if no second DCI is multiplexed with the downlink channel based at least in part on determining that the other first DCI is not received or is not configured.

9. A method of wireless communication performed by a user equipment (UE), comprising:
receiving configuration information that schedules a search space set;
receiving, on the search space set, first downlink control information (DCI) that schedules or configures one or more second DCIs that are multiplexed with one or more semi-persistent scheduling occasions;
processing the one or more second DCIs based at least in part on the first DCI;
determining that another first DCI is not received or is not configured; and
processing a second DCI corresponding to the first DCI in accordance with a configured setting based at least in part on determining that the other first DCI is not received or is not configured.

10. The method of claim 1, wherein the first DCI configures one or more second DCI for one or more corresponding semi-persistent scheduling occasions.

11. A method of wireless communication performed by a user equipment (UE), comprising:
receiving medium access control (MAC) information that schedules or configures a set of downlink control information (DCIs) that are multiplexed with one or more semi-persistent scheduling occasions;
processing the set of DCIs based at least in part on the MAC information; and
wherein the MAC information indicates at least one of:
a number of component DCIs in the set of DCIs,
a modulation order for the set of DCIs, or
a beta offset of the set of DCIs.

12. A method of wireless communication performed by a user equipment (UE), comprising:
receiving medium access control (MAC) information that schedules or configures a set of downlink control information (DCIs) that are multiplexed with one or more semi-persistent scheduling occasions;
processing the set of DCIs based at least in part on the MAC information, wherein the MAC information is first MAC information;
determining that second MAC information is not received or is not configured; and
processing a downlink channel on a corresponding semi-persistent scheduling occasion as if no DCI is multiplexed with the downlink channel based at least in part on determining that the second MAC information is not received or is not configured.

13. A method of wireless communication performed by a user equipment (UE), comprising:
receiving medium access control (MAC) information that schedules or configures a set of downlink control information (DCIs) that are multiplexed with one or more semi-persistent scheduling occasions;
processing the set of DCIs based at least in part on the MAC information; and
receiving signaling indicating a rule for processing the set of DCIs in case the MAC information is not received or is not configured.

14. The method of claim 11, wherein the MAC information configures the set of DCIs for one or more corresponding semi-persistent scheduling occasion.

15. The method of claim 11, wherein the MAC information configures respective DCIs for multiple semi-persistent scheduling occasions.

16. A user equipment (UE) for wireless communication, comprising:
a memory; and
one or more processors operatively coupled to the memory, the memory and the one or more processors configured to:
receive configuration information that schedules a search space set;
receive, on the search space set, first downlink control information (DCI) that schedules or configures one or more second DCIs that are multiplexed with one or more semi-persistent scheduling occasions;
process the one or more second DCIs based at least in part on the first DCI; and
wherein the search space set includes a single control channel candidate and a single aggregation level.

17. The UE of claim 16, wherein the search space set occurs before the one or more semi-persistent scheduling occasions.

18. The UE of claim 16, wherein the search space set is one of a plurality of search space sets, configured by the configuration information, that occur periodically.

19. A user equipment (UE) for wireless communication, comprising:
a memory; and
one or more processors operatively coupled to the memory, the memory and the one or more processors configured to:
receive configuration information that schedules a search space set;
receive, on the search space set, first downlink control information (DCI) that schedules or configures one or more second DCIs that are multiplexed with one or more semi-persistent scheduling occasions;
process the one or more second DCIs based at least in part on the first DCI;
wherein the search space set is one of a plurality of search space sets, configured by the configuration information, that occur periodically;
wherein a periodicity of the plurality of search space sets is less frequent than a periodicity associated with the one or more semi-persistent scheduling occasions, and
wherein the first DCI includes scheduling information for a plurality of second DCIs on respective semi-persistent scheduling occasions.

20. A user equipment (UE) for wireless communication, comprising:
a memory; and
one or more processors operatively coupled to the memory, the memory and the one or more processors configured to:
receive configuration information that schedules a search space set;
receive, on the search space set, first downlink control information (DCI) that schedules or configures one or more second DCIs that are multiplexed with one or more semi-persistent scheduling occasions;
process the one or more second DCIs based at least in part on the first DCI; and
receive DCI or medium access control (MAC) signaling activating or deactivating the search space set, wherein receiving the first DCI is based at least in part on the DCI or MAC signaling activating or deactivating the search space set.

21. A user equipment (UE) for wireless communication, comprising:
   a memory; and
   one or more processors operatively coupled to the memory, the memory and the one or more processors configured to:
      receive configuration information that schedules a search space set;
      receive, on the search space set, first downlink control information (DCI) that schedules or configures one or more second DCIs that are multiplexed with one or more semi-persistent scheduling occasions;
      process the one or more second DCIs based at least in part on the first DCI; and
      wherein the first DCI uses a dedicated radio network temporary identifier that indicates that the first DCI is associated with scheduling the one or more second DCIs.

22. A user equipment (UE) for wireless communication, comprising:
   a memory; and
   one or more processors operatively coupled to the memory, the memory and the one or more processors configured to:
      receive configuration information that schedules a search space set;
      receive, on the search space set, first downlink control information (DCI) that schedules or configures one or more second DCIs that are multiplexed with one or more semi-persistent scheduling occasions;
      process the one or more second DCIs based at least in part on the first DCI; and
      wherein the first DCI indicates at least one of:
         a number of component DCIs in the one or more second DCIs,
         a modulation order for the one or more second DCIs, or
         a beta offset of the one or more second DCIs.

23. A user equipment (UE) for wireless communication, comprising:
   a memory; and
   one or more processors operatively coupled to the memory, the memory and the one or more processors configured to:
      receive configuration information that schedules a search space set;
      receive, on the search space set, first downlink control information (DCI) that schedules or configures one or more second DCIs that are multiplexed with one or more semi-persistent scheduling occasions;
      process the one or more second DCIs based at least in part on the first DCI;
      determine that another first DCI is not received or is not configured; and
      process a downlink channel on a corresponding semi-persistent scheduling occasion as if no second DCI is multiplexed with the downlink channel based at least in part on determining that the other first DCI is not received or is not configured.

* * * * *